United States Patent
Sargis

(10) Patent No.: US 9,950,244 B1
(45) Date of Patent: Apr. 24, 2018

(54) MOTORIZED WHEEL ASSEMBLY

(71) Applicant: Raman Sargis, San Jose, CA (US)

(72) Inventor: Raman Sargis, San Jose, CA (US)

( * ) Notice: Subject to any disclaimer, the term of this patent is extended or adjusted under 35 U.S.C. 154(b) by 0 days.

(21) Appl. No.: 15/445,916

(22) Filed: Feb. 28, 2017

(51) Int. Cl.
| | | |
|---|---|---|
| *A63C 17/12* | (2006.01) | |
| *A63C 17/14* | (2006.01) | |
| *A63C 17/01* | (2006.01) | |
| *A63C 17/00* | (2006.01) | |
| *B60L 11/18* | (2006.01) | |

(52) U.S. Cl.
CPC .......... *A63C 17/12* (2013.01); *A63C 17/0013* (2013.01); *A63C 17/011* (2013.01); *A63C 17/1409* (2013.01); *B60L 11/1822* (2013.01); *A63C 2017/1472* (2013.01)

(58) Field of Classification Search
CPC ....... A63C 17/12; A63C 17/26; A63C 17/011; B62D 51/00; B62D 51/02; B62D 61/12; B62D 61/125; B62K 3/002
See application file for complete search history.

(56) References Cited

U.S. PATENT DOCUMENTS

| | | | | |
|---|---|---|---|---|
| 4,186,934 A * | 2/1980 | Collings | ................... | B62H 1/12 280/221 |
| 5,695,021 A * | 12/1997 | Schaffner | ................. | B60G 3/06 180/208 |
| 6,095,267 A * | 8/2000 | Goodman | .............. | B62K 5/007 180/6.5 |
| 6,338,393 B1 * | 1/2002 | Martin | ................... | B62K 3/002 180/227 |
| 6,394,213 B1 * | 5/2002 | Tsai | ....................... | B62K 3/002 180/181 |
| 6,942,053 B2 * | 9/2005 | Hinton | ................... | B62D 61/04 180/209 |
| 2002/0079855 A1 * | 6/2002 | Parks | ..................... | B62K 3/002 318/560 |
| 2002/0117341 A1 * | 8/2002 | Lan | ........................ | B62K 3/002 180/181 |
| 2002/0124764 A1 * | 9/2002 | Coveyou | ............. | B62D 53/005 104/137 |
| 2002/0148663 A1 * | 10/2002 | Chang | ................... | B62K 3/002 180/210 |
| 2003/0024752 A1 * | 2/2003 | Mayer | ................... | B62K 3/002 180/220 |
| 2003/0037980 A1 * | 2/2003 | Chen | ...................... | B62K 3/002 180/220 |
| 2003/0042058 A1 * | 3/2003 | Chen | ...................... | B62K 3/002 180/180 |
| 2005/0139406 A1 * | 6/2005 | McLeese | ............... | A63C 17/01 180/180 |

(Continued)

*Primary Examiner* — Katy M Ebner
(74) *Attorney, Agent, or Firm* — Charles L. Thoeming

(57) ABSTRACT

A motorized wheel assembly adaptable to skateboards provides drive motor and power sources and controls for the directed control of forward or backward propulsion of the skateboard using throttle and braking controls, the motorized wheel, and all skateboard wheels. Weight transfer assemblies for the motorized wheel transfer a portion of a skateboard rider's weight through the front mounted motorized wheel to the ground surface creating sufficient traction for the motorized wheel to propel the skateboard. One weight transfer assembly embodiment provides a pivoting, compression based mounting bracket. Separate embodiments of the weight transfer assemblies include single or dual shock absorbers.

19 Claims, 17 Drawing Sheets

(56) References Cited

U.S. PATENT DOCUMENTS

| | | | |
|---|---|---|---|
| 2007/0045022 A1* | 3/2007 | Greig | B62D 37/00 |
| | | | 180/215 |
| 2007/0187164 A1* | 8/2007 | Yang | B62D 61/12 |
| | | | 180/209 |
| 2011/0127734 A1* | 6/2011 | Epstein | A63C 5/16 |
| | | | 280/11.19 |
| 2016/0059108 A1* | 3/2016 | Demolder | A63C 17/12 |
| | | | 701/22 |
| 2016/0213999 A1* | 7/2016 | Treadway | A63C 17/0046 |
| 2017/0190365 A1* | 7/2017 | Campbell | B62D 51/02 |
| 2017/0217511 A1* | 8/2017 | Orlovskiy | A63C 17/12 |

* cited by examiner

MOTORIZED WHEEL ASSEMBLY

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

TECHNICAL FIELD

The present invention relates generally to a motorized wheel assembly, and more specifically to an electric motorized wheel assembly adaptable to the front deck of a common four-wheel skateboard.

BACKGROUND OF THE INVENTION

Motorized skateboards and scooters have gained popularity, ranging from casual commuter riders to those in the extreme end of the action sports community. Many contemporary motorized skateboards and scooters typically are powered by a motor and power supply mounted to the underside of a skateboard or scooter deck. The motor is mechanically linked to a selected one of the rear pair of skateboard wheels or a rear scooter wheel. Other motorized skateboards or scooters use a separate power wheel located between the wheels of the skateboard or scooter.

Disadvantages of the present state of the art include: 1) the motor and battery greatly reduce clearance under the board or scooter deck causing unintentional scraping of components when riding over obstacles or uneven surfaces and thus limiting the use of these assemblies to well paved surfaces; 2) the motor and battery pack require protective shielding against unintentional and harsh bumping and scraping; and 3) all the motor elements are pre-integrated into the structure of the board or scooter which limits usage to a single board or scooter.

Therefore, there is a need in the art for an improved motorized wheel assembly with an adaptable weight transfer assembly for use with skateboards in comparison to the prior art.

Accordingly, there is a need for an improved motorized wheel assembly combined with an adaptable weight transfer assembly that provides for a front mounted wheel which improves the ability to pull the skateboard over rough or uneven surfaces.

Similarly, there is a need for an improved motorized wheel assembly combined with an adaptable weight transfer assembly that adapt to existing skateboards as an after-market accessory, providing the use of the assembly on multiple such user owned transport or sporting devices.

There is likewise a need for an improved motorized wheel assembly combined with an adaptable weight transfer assembly that are easily attached or removed from skateboards.

Furthermore, what is needed is an improved motorized wheel assembly combined with an adaptable weight transfer assembly that can be adapted to existing skateboard deck and truck designs such these utilities can be added to the existing characteristics of the rider's favorite skateboard design.

Various aspects of the motorized wheel assembly address these needs, as are discussed in more detail below.

DISCLOSURE OF INVENTION

The motorized wheel assembly combined with an adaptable weight transfer assembly is used to motorize a common skateboard using a separate motorized wheel. The motorized front wheel assembly is self-contained with battery pack, electric motor, control electronics, charging port, handle bars, braking system, and the weight transfer assembly required to attach to a skateboard. The motorized wheel assembly construction does not have to be as heavy-duty as those used for electric skateboards in the art. For example, the motorized wheel assembly attached to a skateboard, carries only a fraction of rider's weight since the existing skateboard wheels bear the direct weight of the rider due to their position under the skateboard. Furthermore, for an embodiment of the motorized wheel assembly, the rider's weight transfer to the motorized wheel assembly is through embodiments of the weight transfer assembly providing at least one compression spring. The skateboard rider's weight is transferred to, and distributed among, the skateboard wheels and the motorized wheel to establish motorized wheel traction. Thus, the motorized wheel assembly can use light duty components for normal rider usage, which reduces weight and cost. Similar weight transfer dynamics are presented by alternate embodiments having at least one shock absorber to provide a range of motion for the front end of the skateboard once it is attached to the motorized wheel assembly.

An essential part of the motorized wheel assembly is a mechanism by which a portion of the rider's weight is transferred to the front wheel. The placement of weight on the motorized front wheel generates surface friction with ground which is essential to propel the skateboard and the rider in forward or reverse direction.

Placement of the motorized wheel in front of the skateboard allows usage of a larger wheel which improves the ability to pull the skateboard over uneven or higher surfaces.

The motorized wheel assembly when mounted on skateboard elevates the two front wheels when rider's weight is not impressed upon the top of skateboard. Once rider's weight is placed onto the skateboard, a portion of rider's weight is transferred through the compression elements to the motorized front wheel while lowering the front two wheels of skateboard to the ground. This constitutes the normal riding position with all four wheels of skateboard in touch with ground surface and with the motorized wheel having enough traction with ground surface to propel the rider forward or backward.

The compression elements (springs, air shock, other elastic bodies) can get integrated into the motorized wheel assembly at different locations within the weight transfer assembly. One embodiment of the weight transfer is the hinge-spring mechanism. The hinge-spring mechanism is integrated into the mounting plate of the motorized wheel assembly, see e.g., FIGS. 2A and 3A. As rider places weight on the skateboard, the hinge plates pivot about the hinge pin allowing the skateboard to lower itself until front two wheels make contact with the ground, see e.g., FIGS. 4A and 4B.

Alternatively, the weight transfer mechanism can be integrated into the wheel fork as a shock element. Three different embodiments of weight transfer using shock are shown with the compression elements in fork, see e.g., FIGS. 5A-5C, FIGS. 6A-6C, and with compression element in the head tube, see e.g., FIGS. 8A and 8B. Similar to the hinge-spring mechanism, while rider's weight is not on the skate board the front two wheels are elevated from ground surface. Once rider's weight is shifted on the skateboard the shock element compresses against the motorized wheel axel allowing the front two wheels of the skateboard to touch ground surface. The compression of the shock transfers portion of rider's weight through front wheel to the ground surface. Such force on motorized front wheel creates traction required to propel the skateboard.

The motorized wheel assembly attached to a skateboard, carries only a fraction of rider's weight since the existing skateboard wheels bear the direct weight of the rider due to the skateboard wheels' position under the skateboard. Furthermore, the rider's weight transfer to provide traction for the motorized wheel assembly is through the weight transfer assembly.

BRIEF DESCRIPTION OF DRAWINGS

These and other features, aspects, and advantages of embodiments of the apparatus for a motorized wheel assembly will become better understood regarding the following description, appended claims, and accompanying drawings as further described.

BEST MODE FOR CARRYING OUT THE INVENTION

Referring more specifically to the drawings, for illustrative purposes embodiments of the apparatus for motorized wheel assembly 10 are more completely set forth in FIGS. 1-12

Figure 9A:
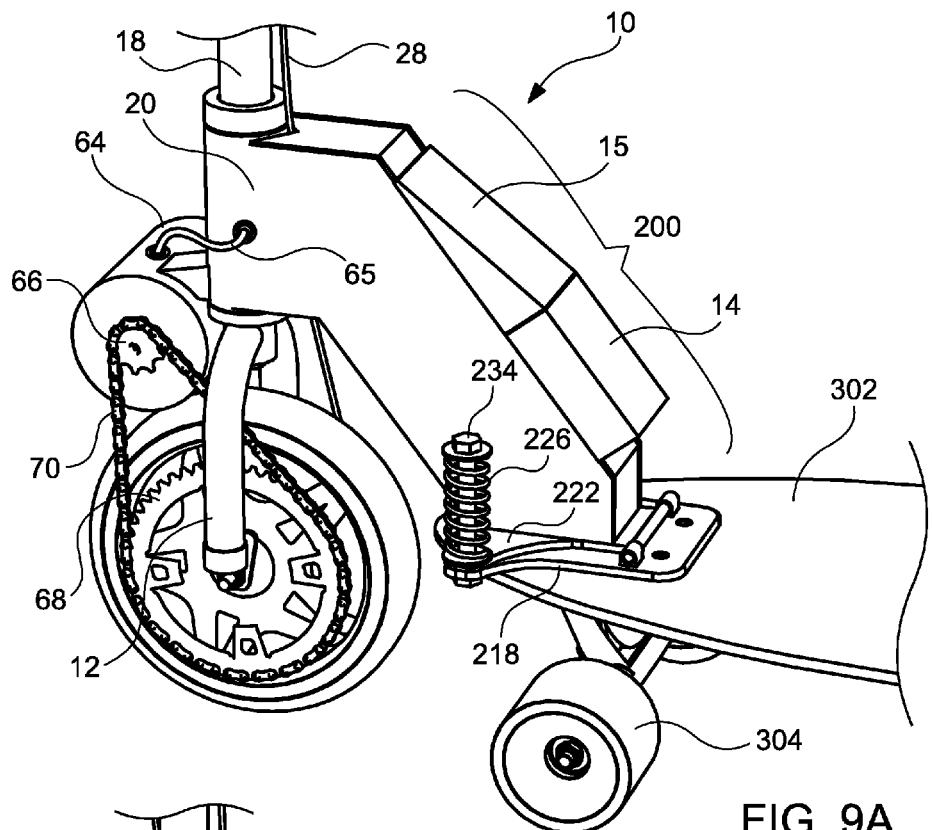
FIG. 9A is a perspective view of an embodiment of motorized wheel assembly 10 providing a wheel 60, a wheel axel 62, an electric motor 64, motor sprocket 66, wheel sprocket 68, and drive chain 70, and a weight transfer assembly 200 that includes compression springs.
Figure 9B:
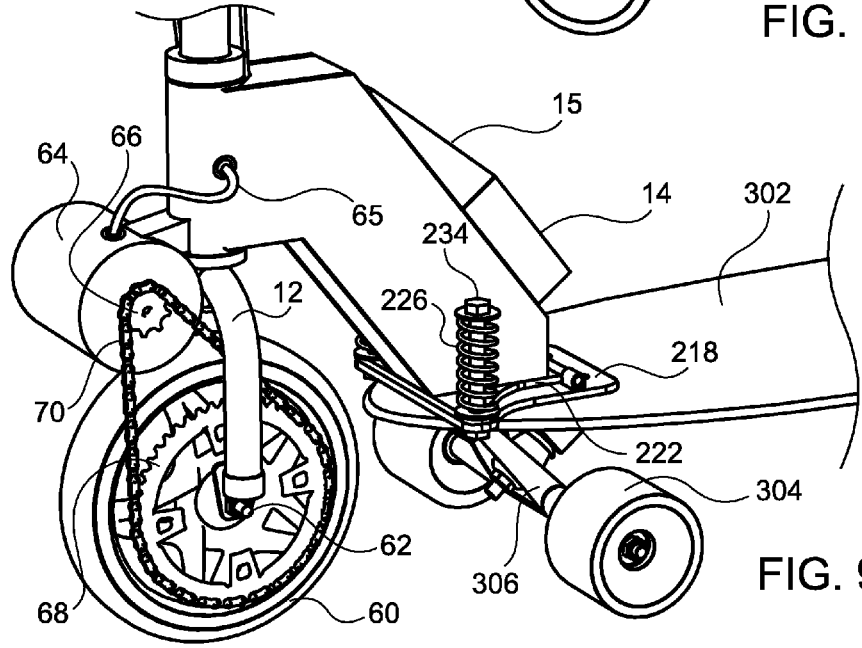
FIG. 9B is an alternate perspective view of the embodiment of motorized wheel assembly 10 of FIG. 9A.

An embodiment of the motorized wheel assembly 10 adaptable to the front deck 302 of a skateboard 300 having front wheels 304 and rear wheels 308 provides a wheel 60 and axel 62, FIGS. 9A and 9B. The wheel 60 and axel 62 are held within a wheel fork assembly 12 connected to the wheel axel 62. A motor assembly 64 is connected to the wheel 60 with a motor sprocket 66 connected to a fixed length drive chain 70 on a wheel sprocket 68. It will be understood by persons having ordinary skill in the art that the attached skateboard 300 will retain its integral and separate steering mechanism independent of steering from the motorized wheel assembly 10. Mounting the motorized wheel assembly 10 allows use of a large wheel thus increasing the ability to pull the skateboard 300 in a variety of rough or uneven surface conditions, or even in off-road environments.

Other embodiments of motorized wheel assembly 10 adaptable to a skateboard 300 having front wheels 304 and rear wheels 308 provide a drive motor assembly integral to a wheel 40 and axel 42, FIGS. 2A-8B.

Figure 10:
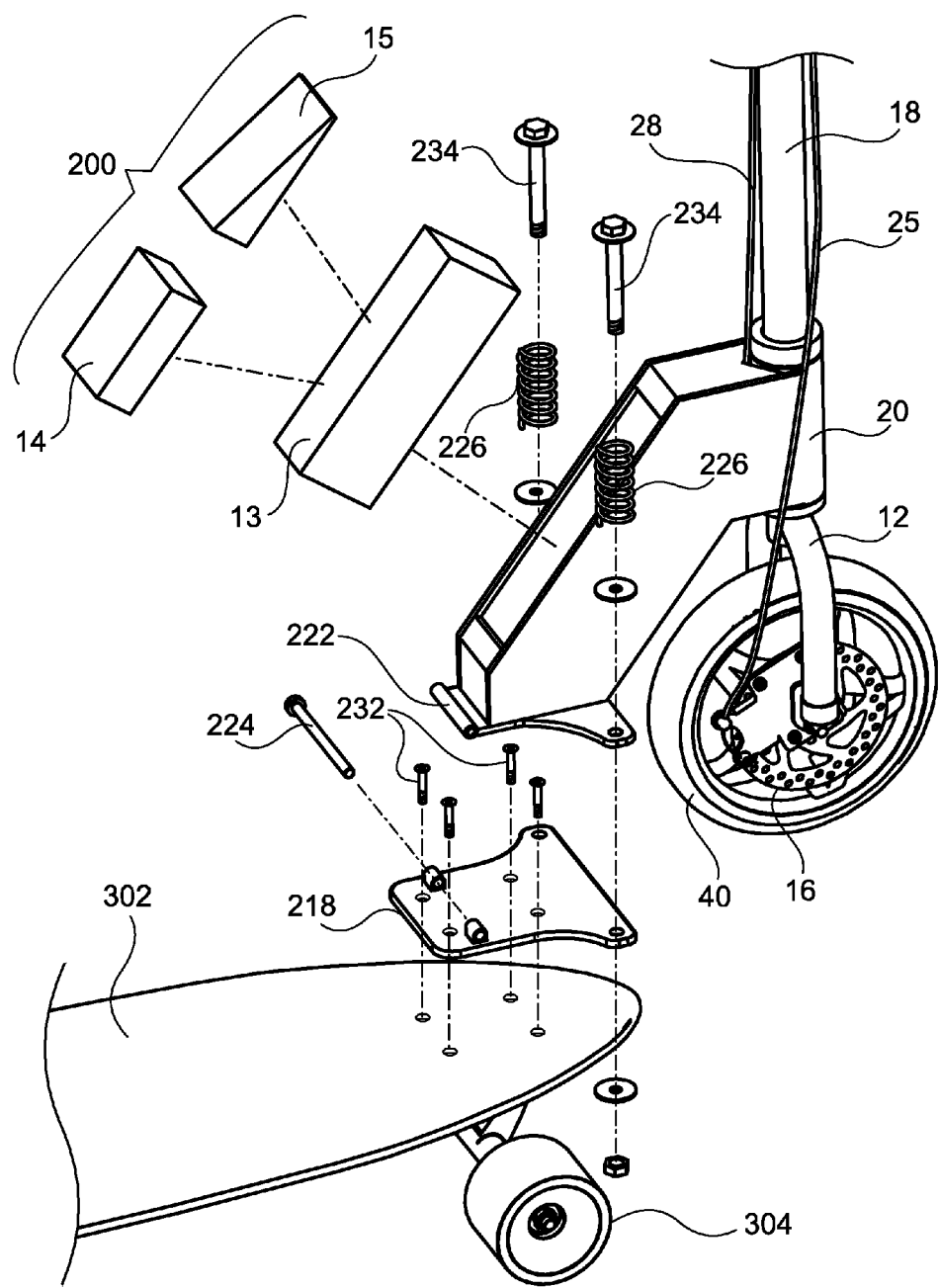
FIG. 10 is an exploded perspective view of the embodiment of weight transfer assembly that includes hinge and compression springs for the embodiment of motorized wheel assembly 10 of FIG. 3B.
Figure 11A:
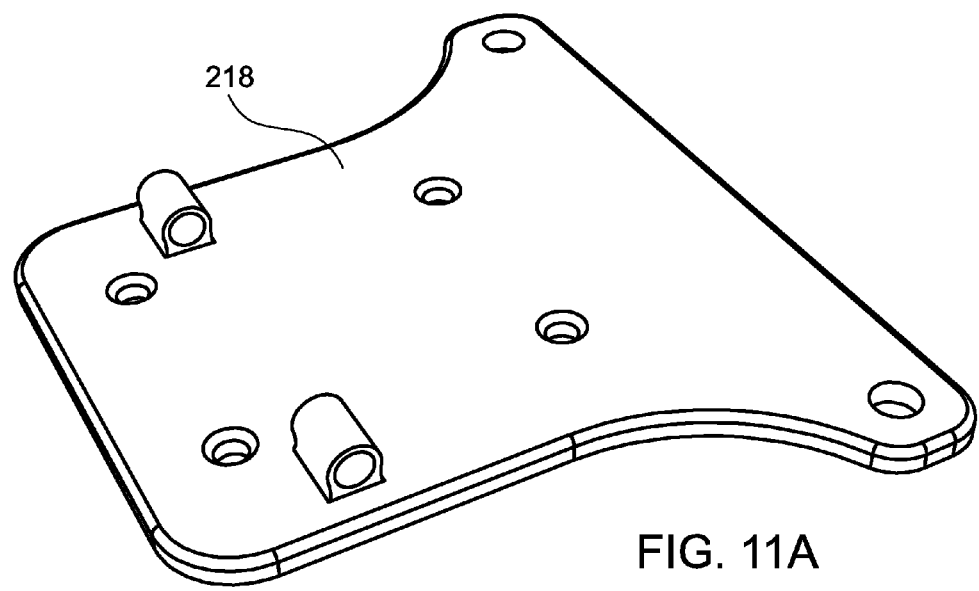
FIG. 11A is a perspective view of a four-hole bottom pivot plate 218 for the embodiment of motorized wheel assembly employing a pivot hinge embodiment of the weight transfer assembly 200, FIG. 10.
Figure 11B:
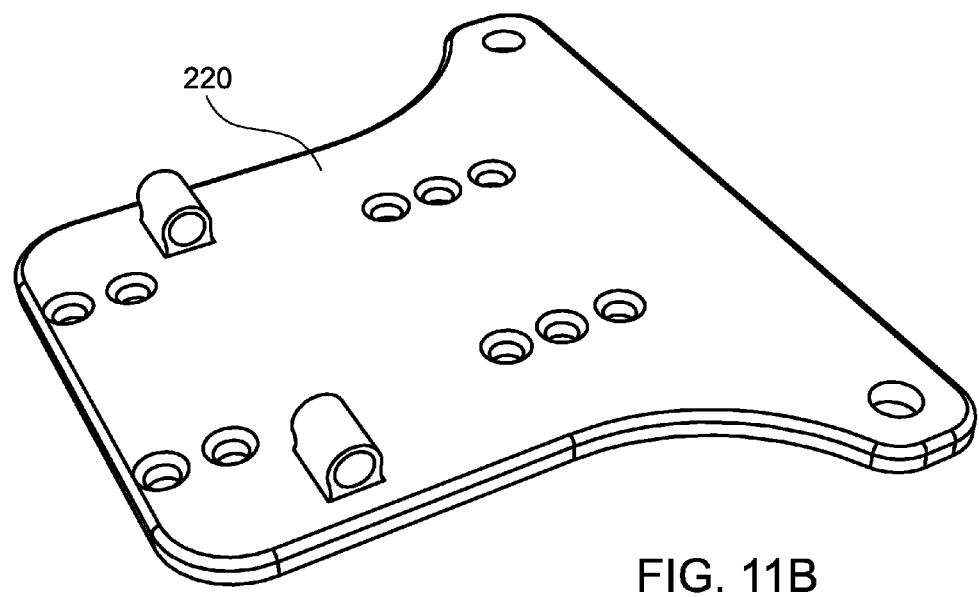
FIG. 11B is a perspective view of a ten-hole bottom pivot plate 220 for an embodiment of motorized wheel assembly employing a pivot hinge embodiment of the weight transfer assembly 200, requiring alternate mounting positions to the skateboard deck 302 front end.
Figure 12:
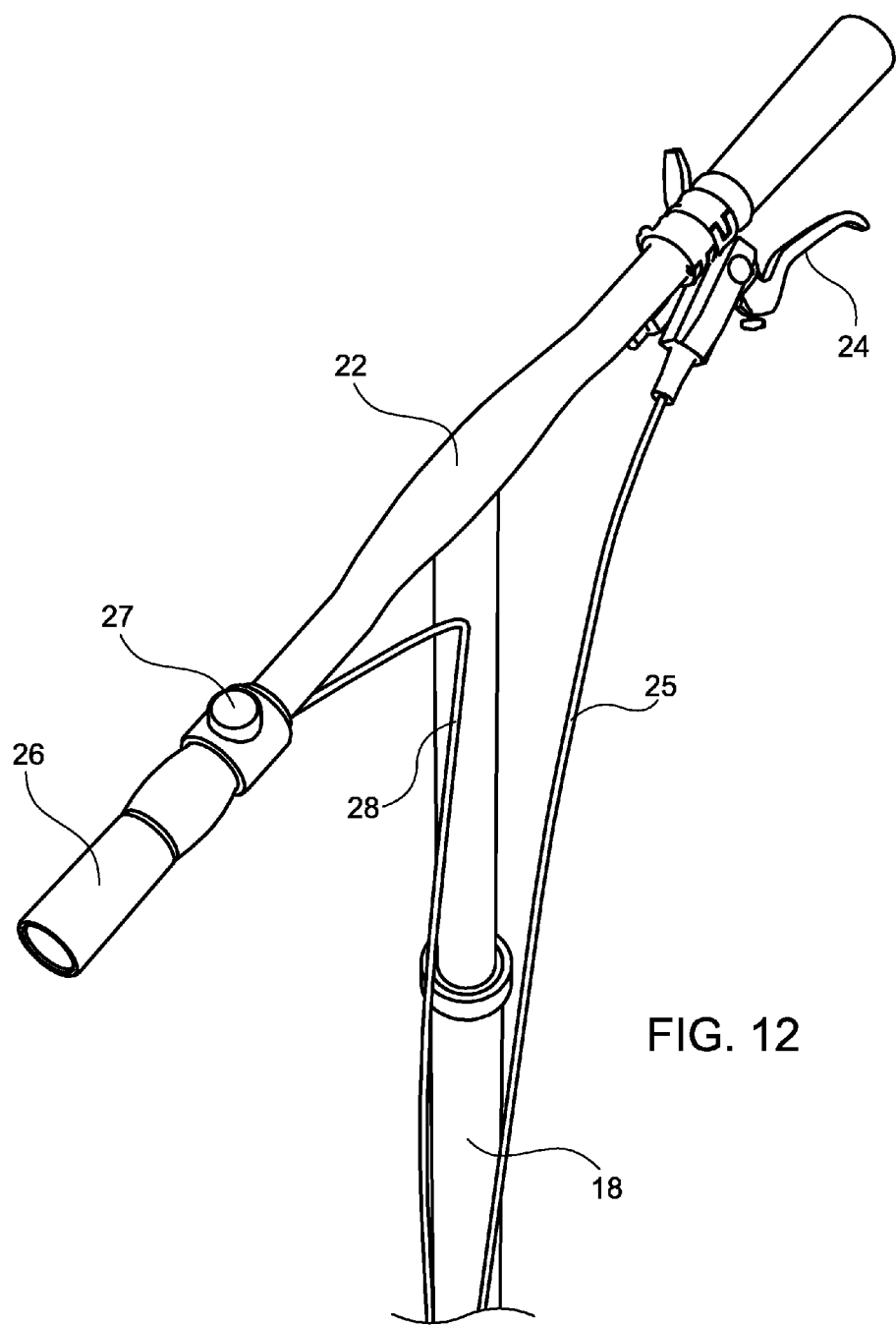
FIG. 12 is a perspective view of the handle bar assembly 22 and handle bar tube 18.

Embodiments of the motorized wheel assembly 10 further include a power supply 13 connected to a throttle control assembly providing a motor controller element 14 and a throttle grip handle 26, FIGS. 10 and 12. The throttle grip handle 26 also provides an on/off switch 27 and is connected to the motor controller element 14 by the throttle cable 28. A disc braking assembly 16 including a braking control assembly 24 are connected to the wheel 40. The motor controller element 14 provides forward or backward propulsion of the skateboard 300 by the attached motorized wheel assembly 10. For all embodiments of the motorized wheel assembly 10, the power supply 13 is housed in the head tube 20, FIG. 10, under the power supply cover 15 and the motor controller element 14 is attached to the head tube 20. For all embodiments of the motorized wheel assembly 10, the electrical wiring and connectors among the power supply 13, the motor controller 14, the throttle grip handle 26, are housed in the head tube 20, except that portion of the throttle cable 28 extending from the handle bar grips 22. Wiring 65 from the motor controller 14 extends from the head tube 20 to the motor 64, FIGS. 9A and 9B, or wiring 41 from the motor controller 14 extends from the head tube 20 to the drive motor assembly integral to a wheel 40 and axel 42, FIGS. 2A and 2B, depending on the embodiment of motorized wheel assembly 10 being considered.

All embodiments of the motorized wheel assembly 10 provide a weight transfer assembly 200 which includes a first attachment assembly communicating with the wheel fork assembly 12. This first attachment assembly is affixed to the head tube 20 which provides a handle bar tube 18 and a handle bar assembly 22, FIGS. 1, 6A-10 and 12. The weight transfer assembly 200 further includes a second attachment assembly communicating with the skateboard deck 302 front end, and the head tube 20 communicating with the wheel fork assembly 12.

For some embodiments of the motorized wheel assembly 10, the first attachment assembly 222 is welded to the head tube 20, FIG. 10. The second attachment assembly 218 is attached to the skateboard deck 302 front end using fasteners connecting the front skateboard truck 306 to the skateboard deck 302, FIG. 9A-10. An elastic, resilient element 226 is provided by weight transfer assembly 200 for each embodiment of the motorized wheel assembly 10. This elastic resilient element 226 is adaptable to a range of motion between a first position in which the front skateboard wheels 304 are above a planar surface 500 below the skateboard 300 upon connecting the motorized wheel assembly to a skateboard deck front end, FIGS. 3A and 3B, and a second position in which the front skateboard wheels 304 contact the planar surface 500 below the skateboard 300 when the skateboard rider steps onto the skateboard deck 302, FIGS. 4A and 4B, providing traction for the wheel 40 or 60 with the planar surface 500 and allowing the skateboard rider to control forward or backward propulsion of the skateboard 300 using the throttle control assembly, the braking control assembly, the wheel 40 or 60, and all skateboard wheels 304 and 302. The elastic, resilient element 226 provides the force necessary to return to the first position of the front skateboard wheels 304 above the planar surface 500 after the skateboard rider steps off the skateboard deck 302.

For an embodiment of the motorized wheel assembly 10, the element connecting the first attachment assembly communicating with the head tube 20 and the second attachment assembly communicating with the skateboard deck 302 front end comprises a pivot hinge assembly. For this embodiment, the elastic, resilient element controlling a range of motion between the first attachment assembly pivoting plate 222 welded to the head tube 20 and the second attachment assembly pivoting plate 218 or 220 attached to the skateboard deck 302 front end includes at least one compression spring 226 affixed by fasteners 234 on one side of the head tube 20 through corresponding apertures in the first attachment assembly 218 and corresponding apertures in the second attachment assembly 222.

Another embodiment of the motorized wheel assembly 10 provides equal sized dual compression springs 226, FIG. 10, affixed by fasteners 234 on either side of the head tube 20 through corresponding apertures in the first attachment assembly pivoting plate 222 and corresponding apertures in the second attachment assembly pivoting plate 218 or 220. For all pivot hinge assembly embodiments of the weight transfer assembly 200 of the motorized wheel assembly 10, a pivot hinge pin 224 connects the first attachment assembly pivoting plate 222 welded to the head tube 20 and the second attachment assembly pivoting plate 218 or 220 attached to the skateboard deck 302 front end. The ten-hole second attachment assembly pivoting plate 220 is provided to receive alternate mounting positions to attach the second attachment assembly pivoting plate to the skateboard deck 302 front end. All pivot hinge assembly embodiments of the weight transfer assembly 200 are adaptable to a range of motion between a first position without a rider weight on the skateboard, FIGS. 3A, 3B, in which hinge pivoting plate is not applying force to springs, and a second position with a rider's weight on the skateboard, FIGS. 4A, 4B, where the pivoting plate 222 rotates about the hinge pin 224, applying force to the springs 226 and resulting in spring compression and the rider's weight transferred to the motorized wheel 40, or the wheel 60.

For an embodiment of the motorized wheel assembly 10, the elastic, resilient element is provided by the weight transfer assembly 200 is a dual shock assembly 214 affixed to the fork stem and to a wheel axel, FIGS. 5A-5C, FIG. 7. This shock assembly 214 is adaptable to a range of motion between a first position in which the front skateboard wheels 304 are above a planar surface 500 below the skateboard 300 upon connecting the motorized wheel assembly to a skateboard deck front end, where the dual shock assemblies are not compressed FIG. 5C, and a second position in which the front skateboard wheels 304 contact the planar surface 500 below the skateboard 300 after the skateboard rider steps onto the skateboard deck 302, where the shock assemblies are compressed with the rider's weight transferred to the motorized wheel 40, FIGS. 5A and 5B.

Figure 6A:
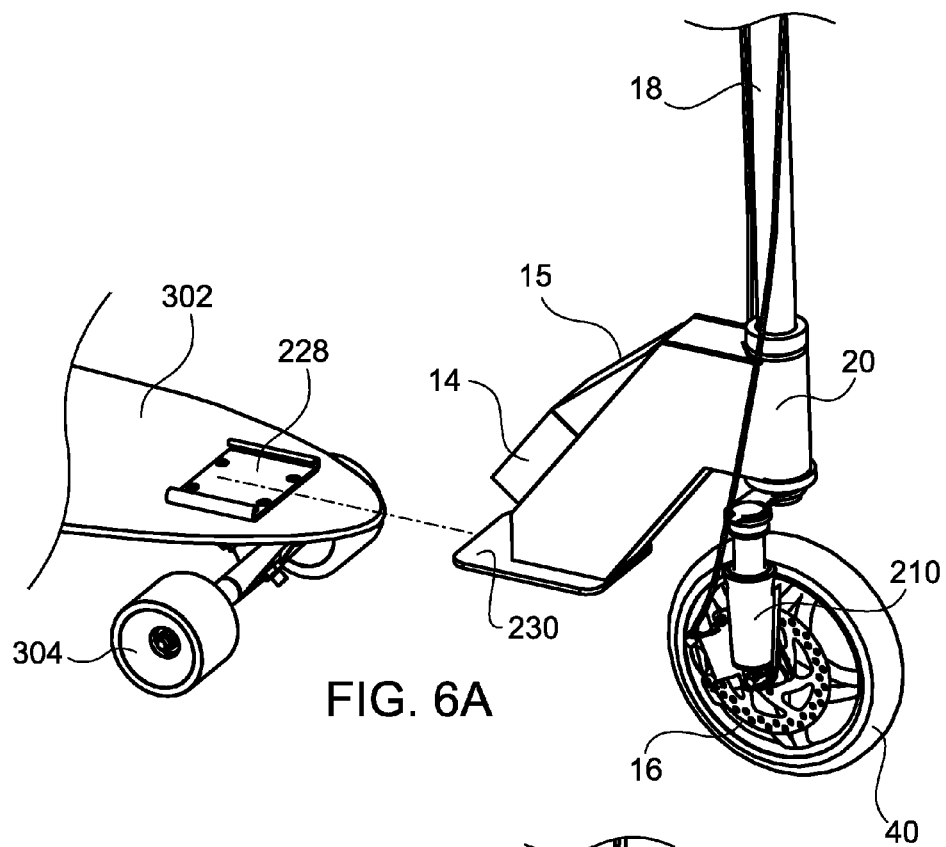
FIG. 6A is a perspective view of an embodiment of motorized wheel assembly 10 where the weight transfer assembly 200 provides a mono-shock assembly 210 and is adapted to be received and held by a receiving element 228 affixed to the skateboard deck 302.
Figure 6B:
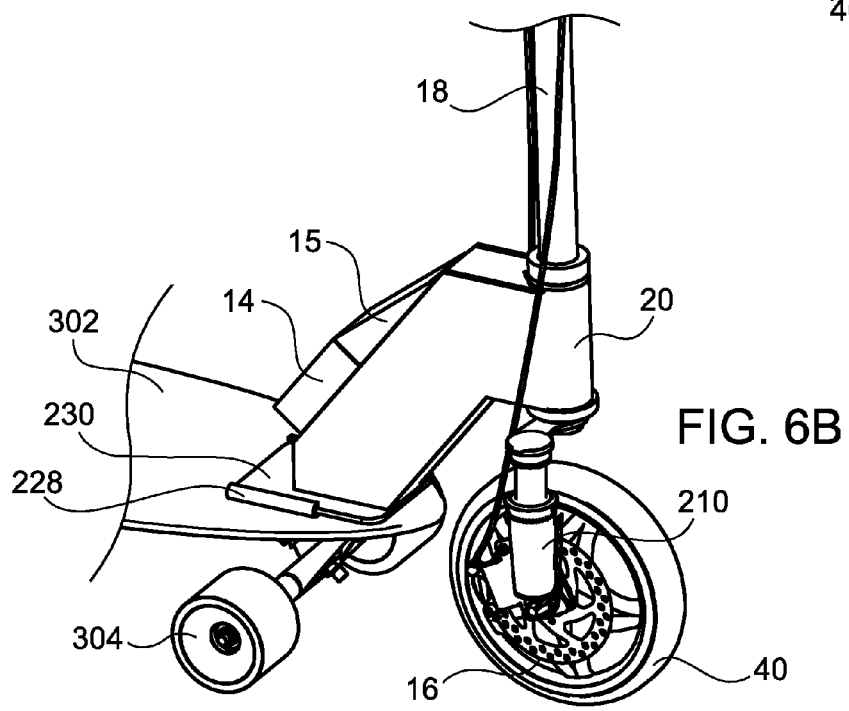
FIG. 6B is a perspective view of the embodiment of motorized wheel assembly 10 of FIG. 6A where the weight transfer assembly 200 is engaged with the receiving element 228.
Figure 6C:
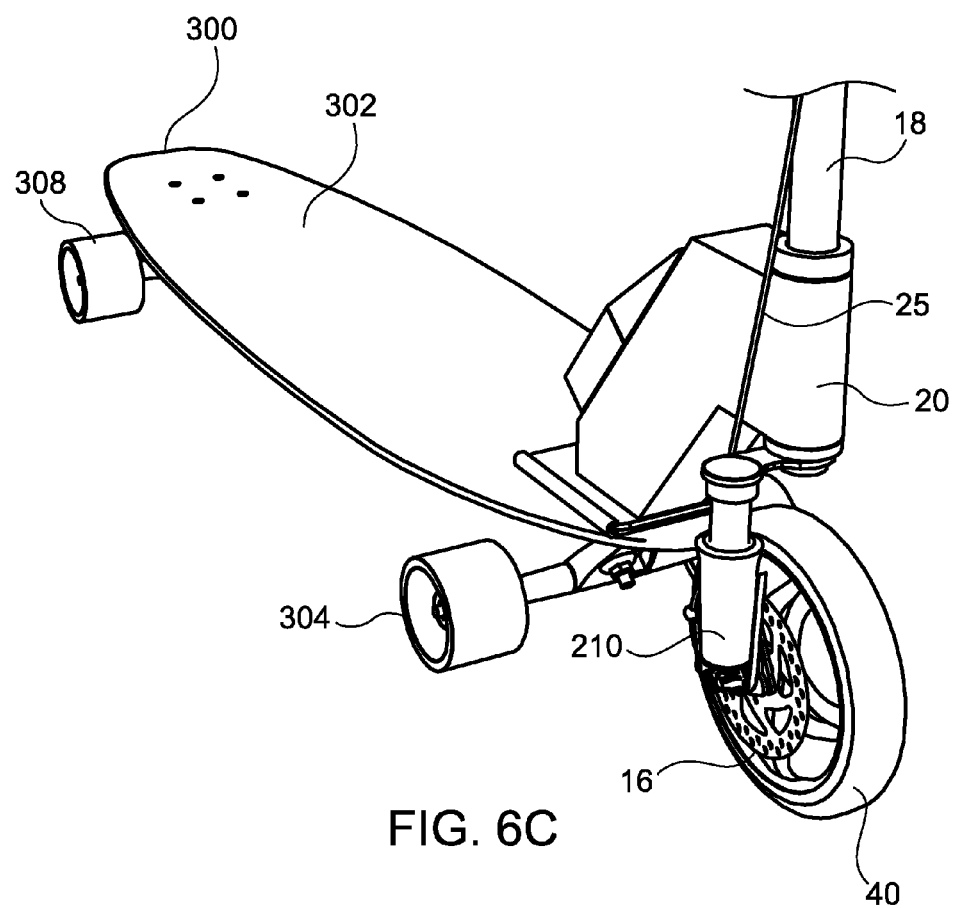
FIG. 6C is a perspective view of the embodiment of motorized wheel assembly 10 of FIG. 6B.
Figure 7:
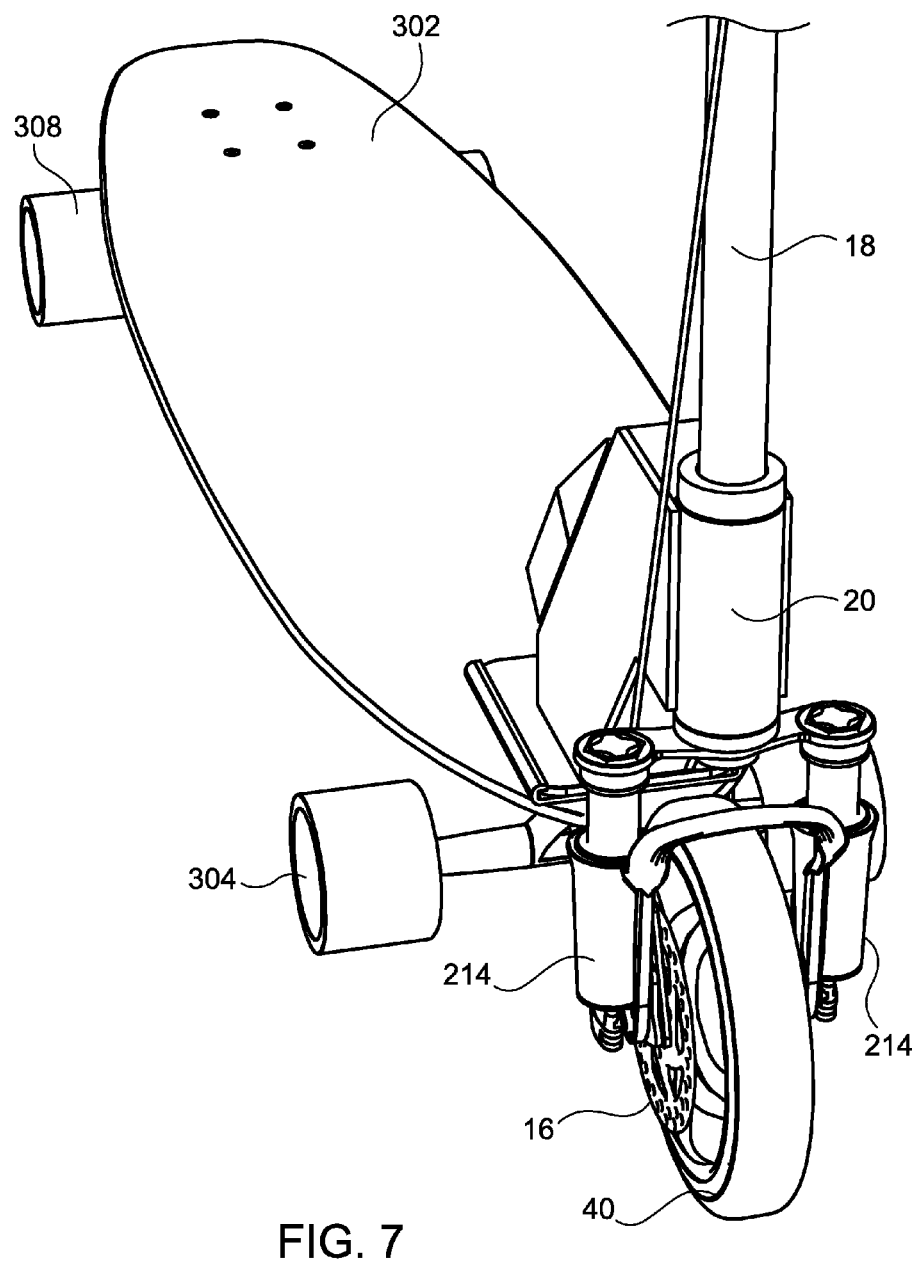
FIG. 7 is an alternative perspective view of the embodiment of motorized wheel assembly 10 of FIG. 5A.

For an embodiment of the motorized wheel assembly 10, the elastic, resilient element is provided by the weight transfer assembly 200 is a shock assembly affixed to the fork stem and to a wheel axel, FIGS. 6A-6C.

Figure 8A:
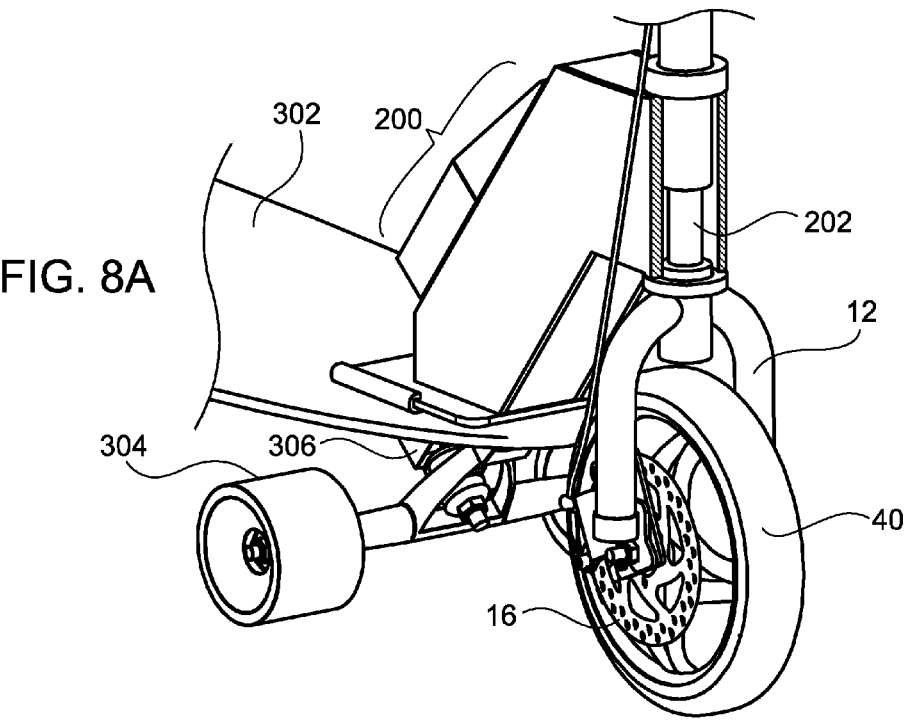
FIG. 8A is a perspective view of the embodiment of motorized wheel assembly 10 of FIG. 5A with front portion of the head tube 20 cut away to depict the head shock assembly 202 of the weight transfer assembly 200.
Figure 8B:
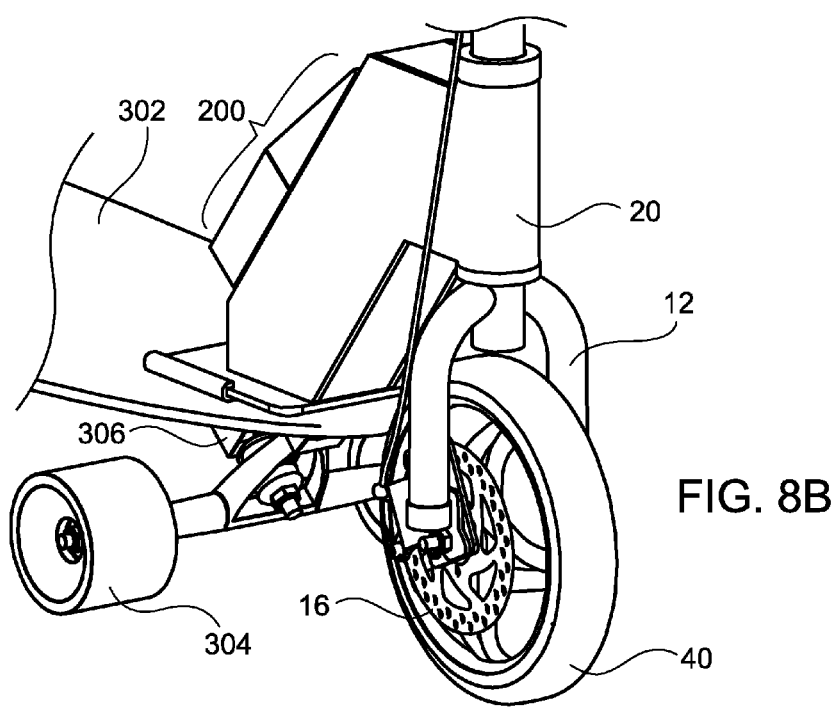
FIG. 8B is a perspective view of FIG. 8A without the cut away portion of the head tube 20.

For an embodiment of the motorized wheel assembly 10, the elastic, resilient element is provided by the weight transfer assembly 200 is head shock assembly disposed within the head tube 20 tube assembly above the wheel fork element FIGS. 8A and 8B.

For an embodiment of the motorized wheel assembly 10, the power supply 13 includes an interchangeable and rechargeable battery pack.

For an embodiment of the motorized wheel assembly, the braking assembly includes a disc brake assembly 16 and a hand brake lever 24 attached to the handle bar assembly 22, FIGS. 1-10, 12.

For embodiments of the motorized wheel assembly 10, the second attachment assembly communicating with the skateboard deck 302 front end includes a receiving slot element 228 affixed to the skateboard deck 302 front end by fasteners connecting the front skateboard truck 306 to the skateboard deck 302 and a tongue element 230 affixed to the head tube 20 sized to be fixedly clipped into and held by the receiving slot element 228 or releasably withdrawn from the receiving slot element 228, FIGS. 6A-8B. The tongue element 230 is releasably held by the receiving slot element 228 by any one of assorted assemblies, such as set screws, spring button-notch assemblies, and the like, known in the art to engage, hold, and manually release slotted elements.

Figure 1:
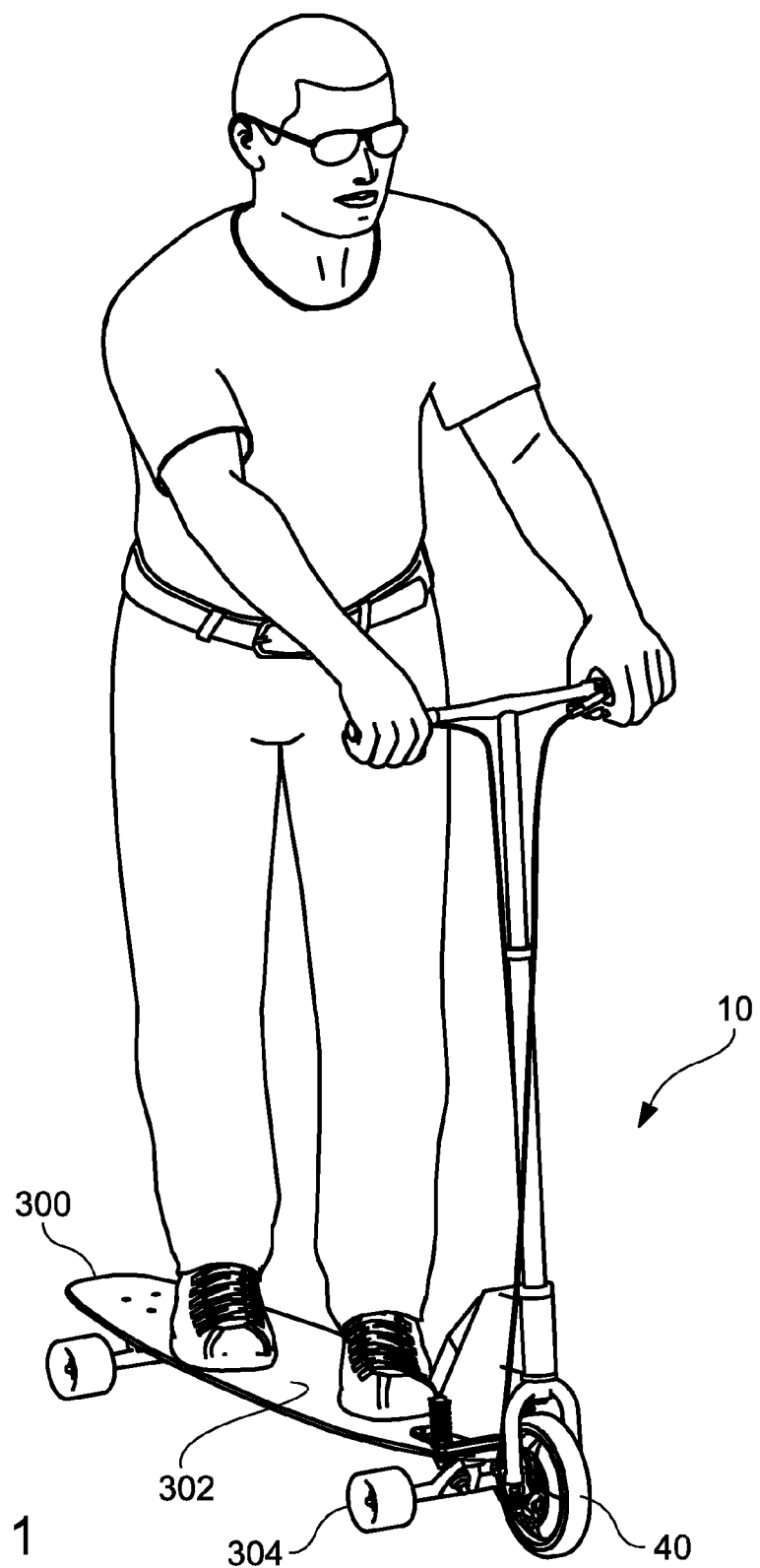
FIG. 1 is a perspective view of a rider using an embodiment of the motorized wheel assembly 10 affixed to the front-end skateboard deck 302 of a skateboard 300.
Figure 2A:
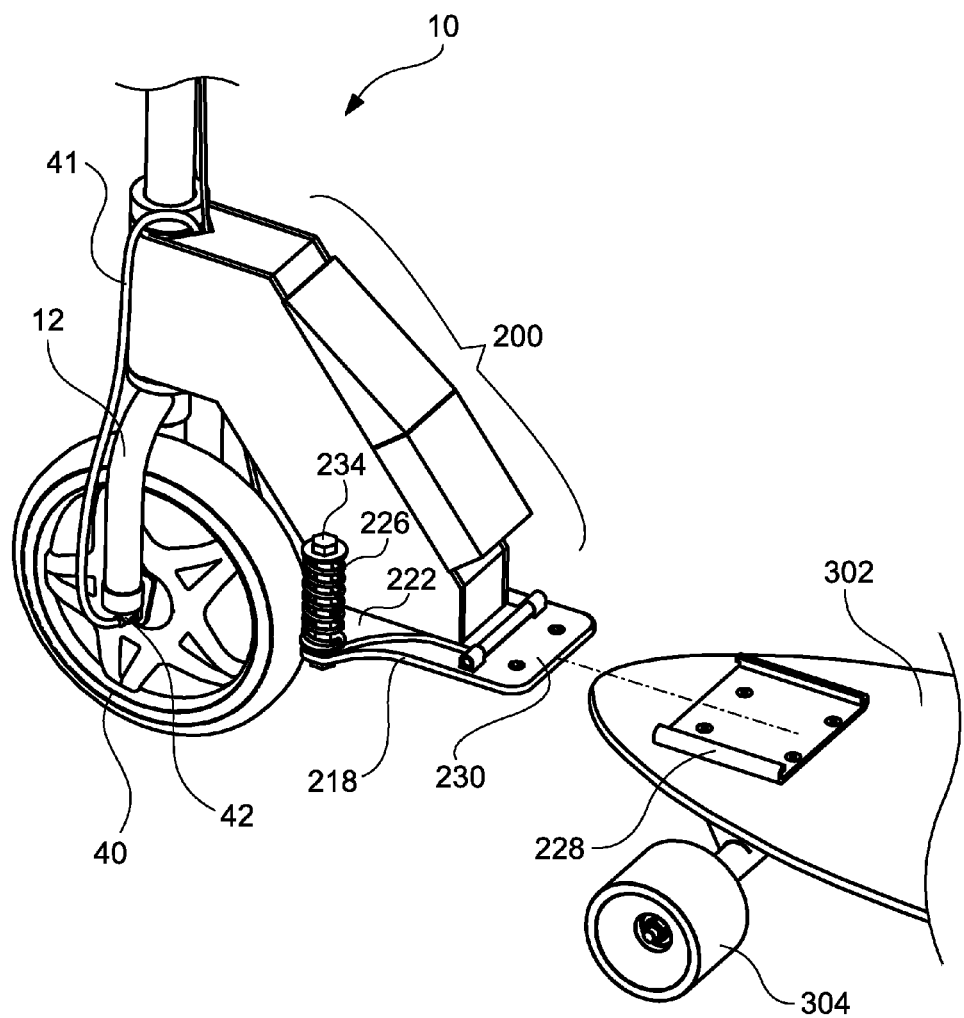
FIG. 2A is a perspective view of an embodiment of a motorized wheel assembly 10 adapted to a skateboard deck 302 by a weight transfer assembly 200 to be received and held by a receiving element 228 affixed to the skateboard deck 302.
Figure 2B:
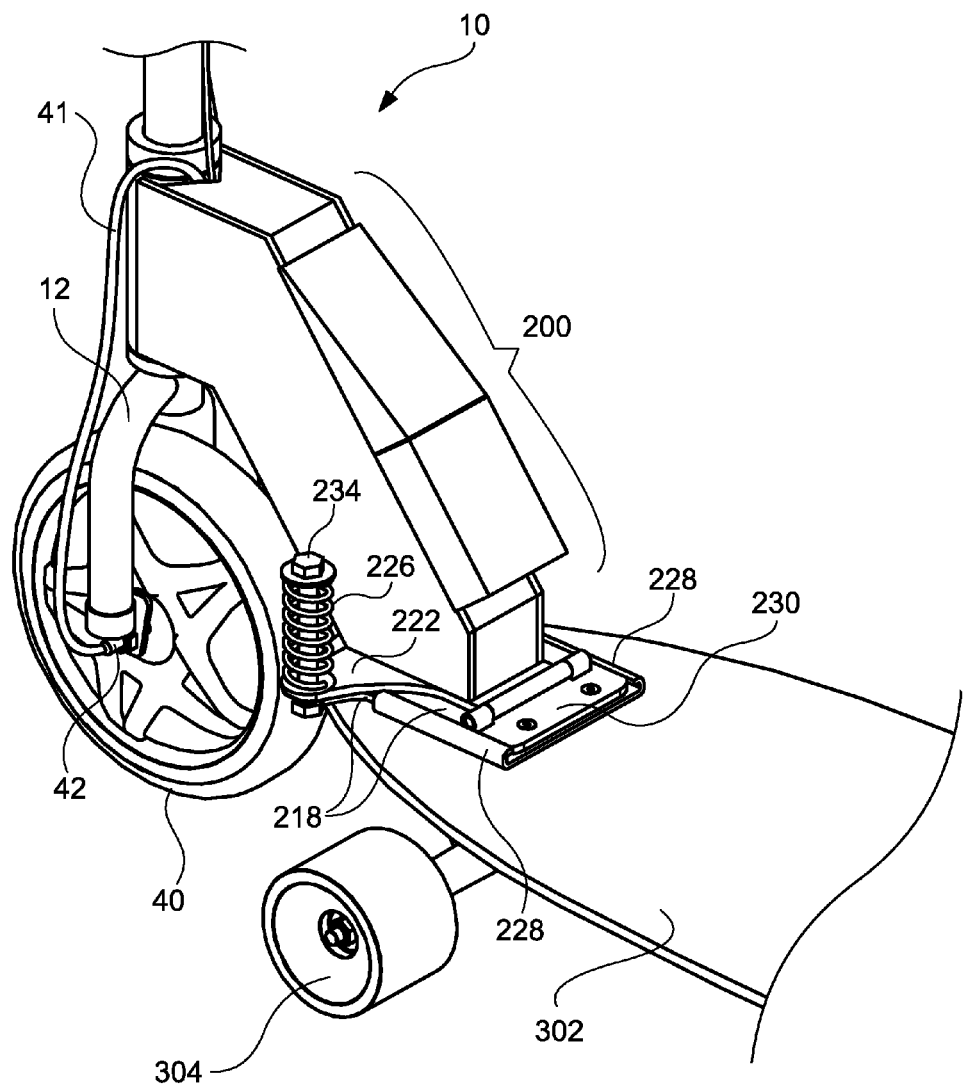
FIG. 2B is a perspective view of the embodiment of a motorized wheel assembly 10 of FIG. 2A with the weight transfer assembly 200 engaged with the receiving element 228.
Figure 3A:
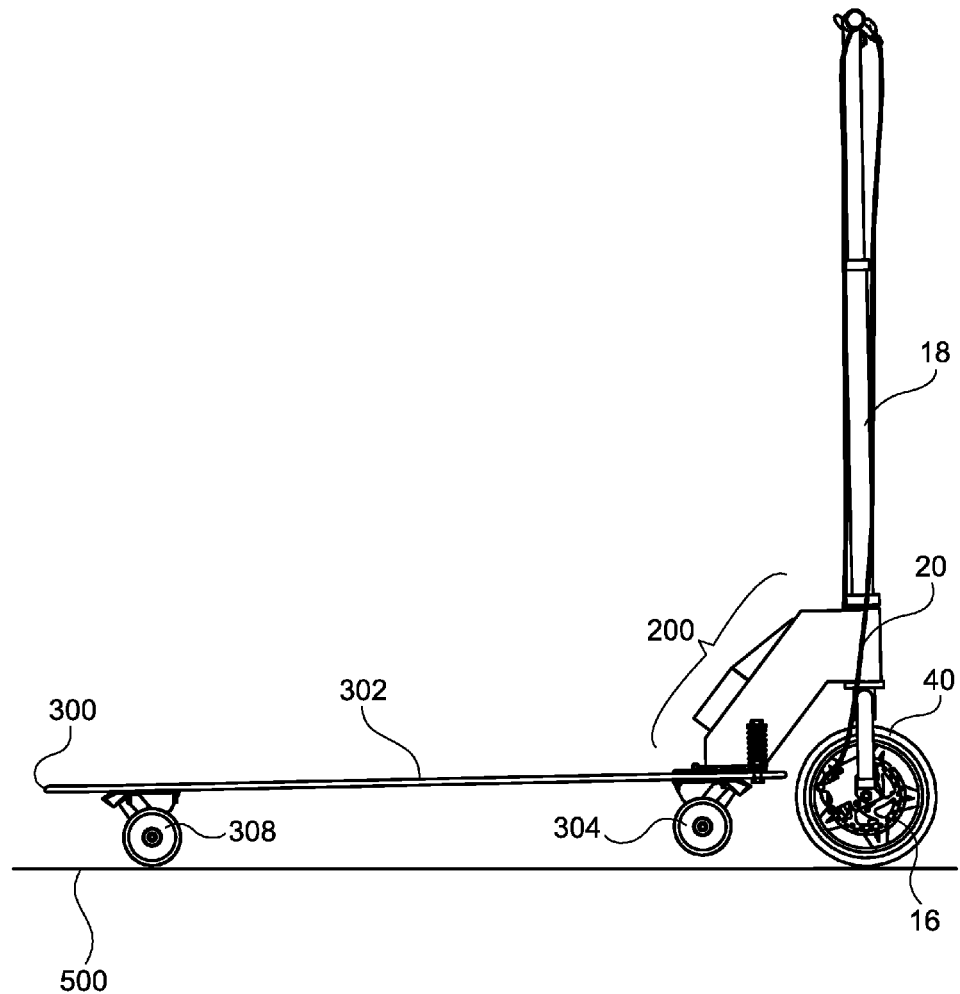
FIG. 3A is a side view of the embodiment of motorized wheel assembly 10 of FIG. 2A adapted to the skateboard deck 302 by the weight transfer assembly 200 with the skateboard front wheels 304 lifted off a planar surface 500 under the skateboard 300.
Figure 3B:
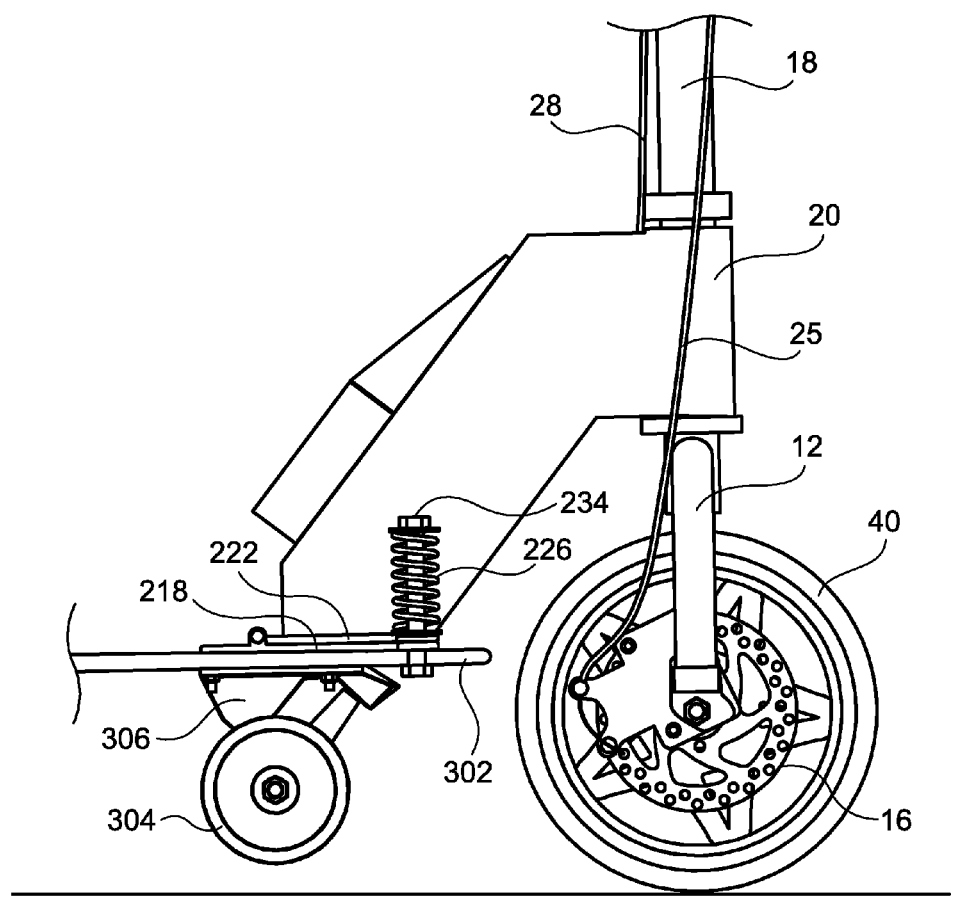
FIG. 3B is an enlarged view of a portion of FIG. 3A.
Figure 4A:
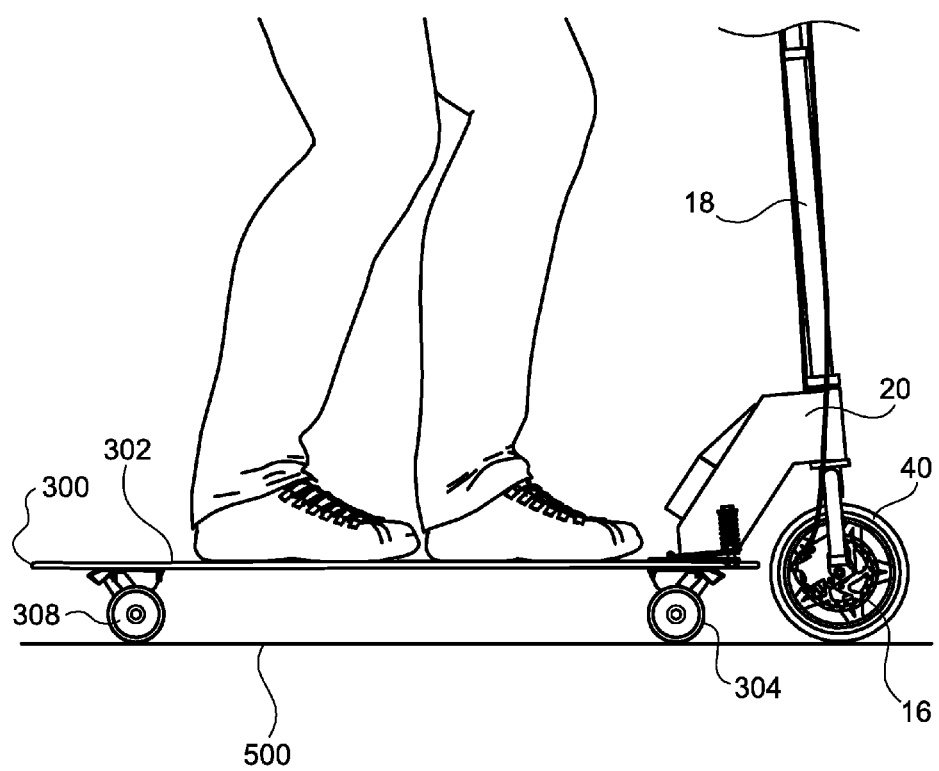
FIG. 4A is a side view of the embodiment of motorized wheel assembly 10 of FIG. 2A adapted to the skateboard deck 302 by the weight transfer assembly 200 with the skateboard front wheels 304 in contact with the planar surface 500 under the skateboard 300 upon a skateboard rider stepping onto the skateboard deck 302, providing traction for the motorized wheel 40 with the planar surface 500 and allowing the skateboard rider to control forward or backward propulsion of the skateboard 300 using the throttle control assembly, the braking control assembly, the motorized wheel 40, and all skateboard wheels, 308 and 304.
Figure 4B:
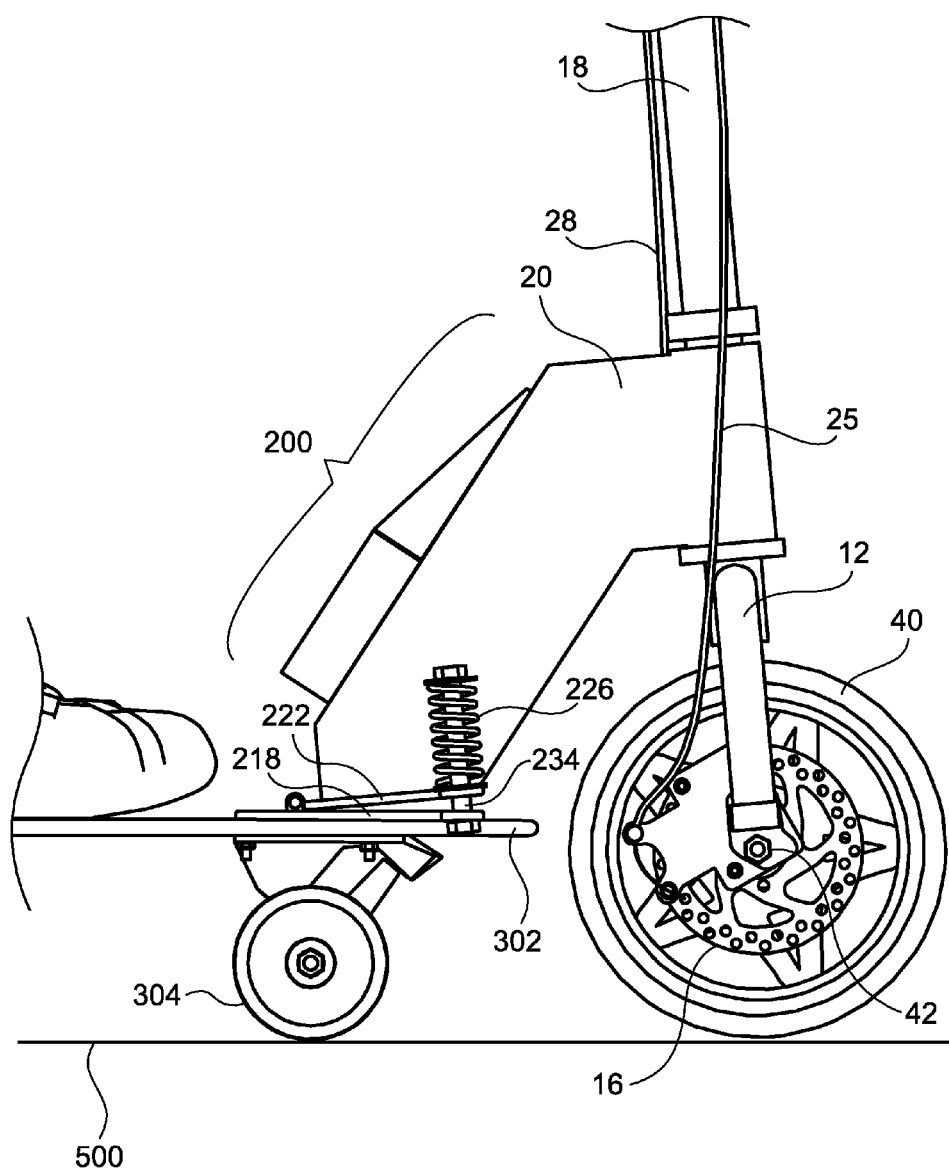
FIG. 4B is an enlarged view of a portion of FIG. 4A.
Figure 5A:
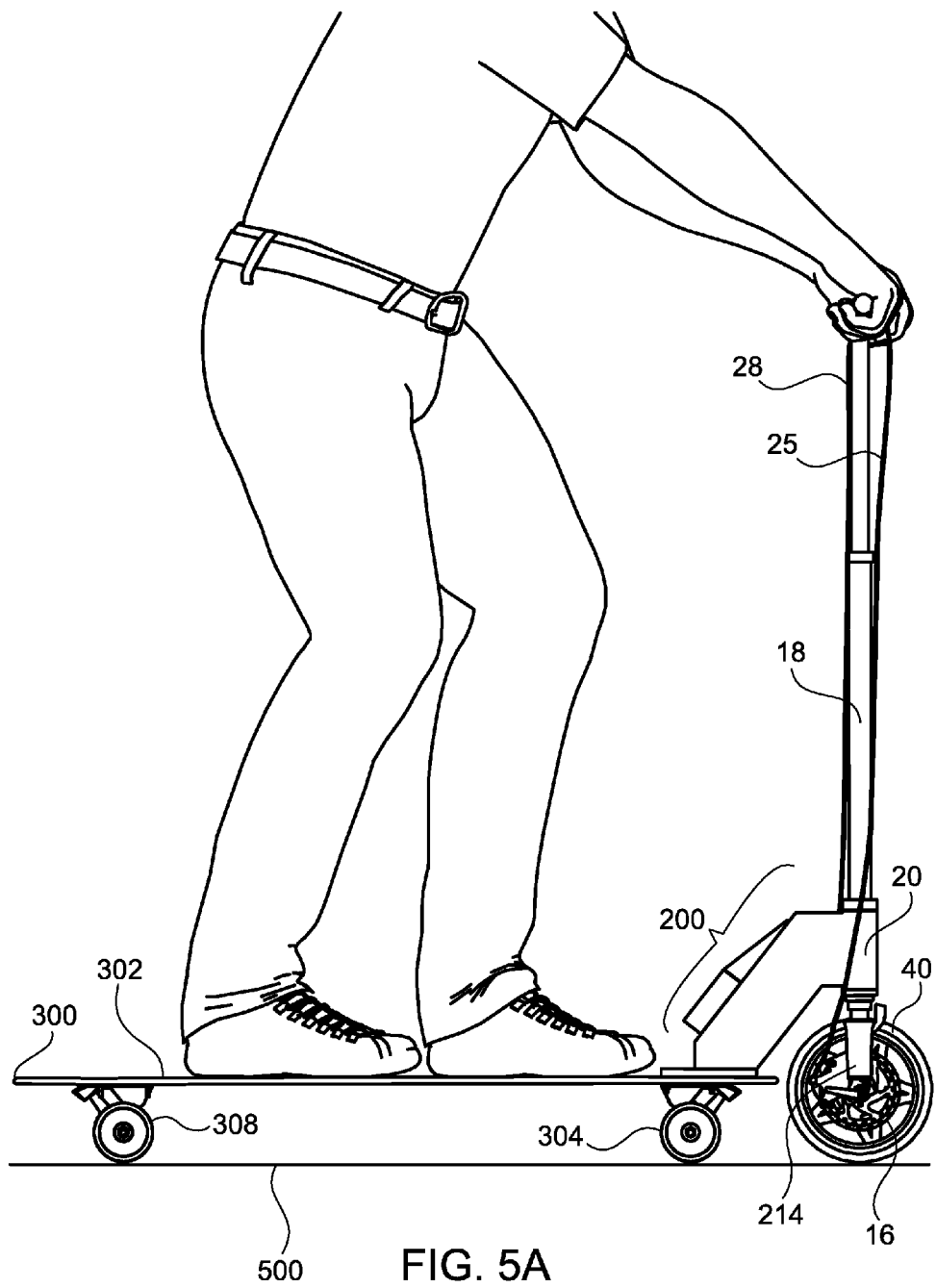
FIG. 5A is a side view of an alternated embodiment of motorized wheel assembly 10 adapted to the skateboard deck 302 by the weight transfer assembly 200 which provides a dual-shock assembly 214 with the skateboard front wheels 304 in contact with the planar surface 500 under the skateboard 300 upon a skateboard rider stepping onto the skateboard deck 302, providing traction for the wheel 40 with the planar surface 500 and allowing the skateboard rider to control forward or backward propulsion of the skateboard 300 using the throttle control assembly, the braking control assembly, the motorized wheel 40, and all skateboard wheels, 308 and 304.
Figure 5B:
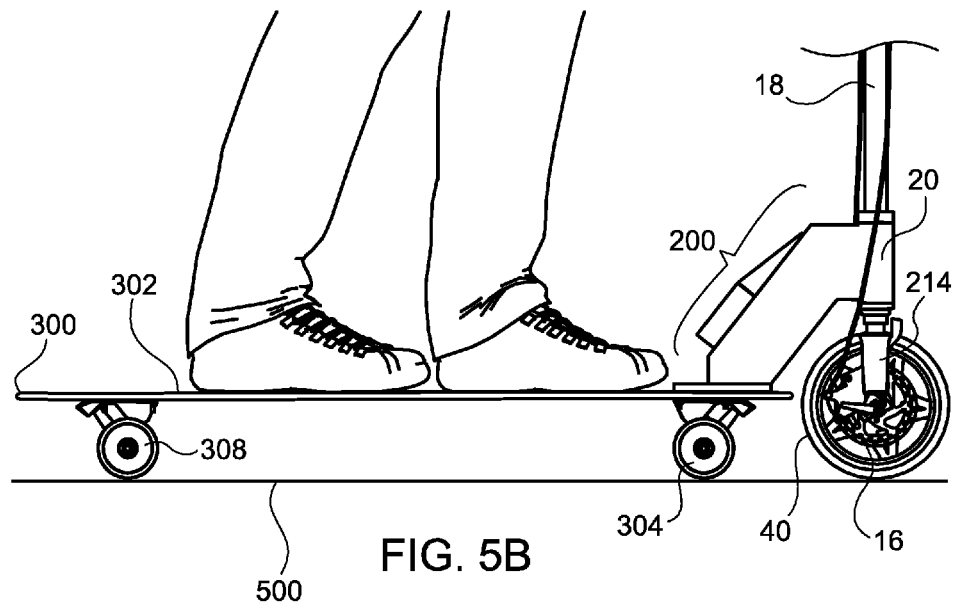
FIG. 5B is a partial view of the embodiment of motorized wheel assembly 10 of FIG. 5A.
Figure 5C:
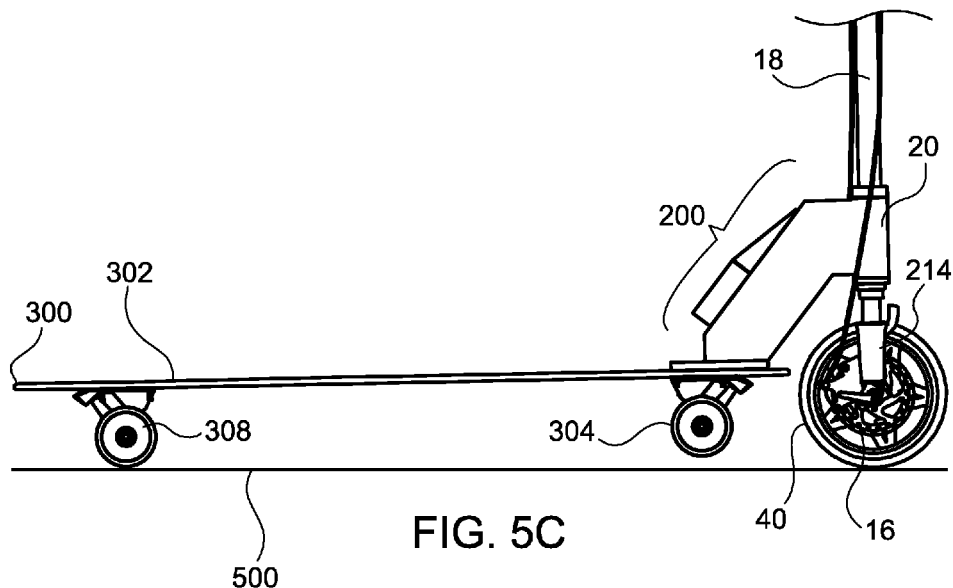
FIG. 5C is a view of the embodiment of motorized wheel assembly 10 of FIG. 5A with the skateboard front wheels 304 lifted off a planar surface 500 under the skateboard 300.

In yet other embodiments of the motorized wheel assembly 10, the bottom plate 218 of the pivot hinge assembly is welded to the top of the tongue element 230 while allowing sufficient space on either side of the tongue element 230 to be fixedly clipped into and held by the receiving slot element 228 or releasably withdrawn from the receiving slot element 228, FIGS. 2A-2B. The hinge action required for the weight transfer function is maintained by the pivoting plate 222 welded to the head tube 20 allowing for the same range of motion as provided by the assembly of FIGS. 9A-10, and depicted in FIGS. 3A-4B.

While the motorized wheel assembly 10 has been described with reference to the embodiments described above, it will be appreciated that the configuration of the motorized wheel assembly 10 can be varied and that the scope of the motorized wheel assembly 10 is defined by the following claims.

I claim:

1. A combination of a skateboard having a deck and front and rear wheels and a motorized wheel assembly, the motorized wheel assembly comprising:
   a) at least one wheel comprising an axle;
   b) a wheel fork assembly connected to the axle;
   c) a drive motor assembly connected to the at least one wheel;
   d) a power supply connected to a throttle control assembly comprising a motor controller element and a throttle grip handle, the throttle control assembly also connected to the drive motor assembly;
   e) a braking assembly connected to the at least one wheel;
   f) a brake control assembly connected to the braking assembly; and
   g) a weight transfer assembly comprising in combination:
      i) a first attachment assembly communicating with the wheel fork assembly, and comprising a head tube assembly and a handle bar assembly;
      ii) a second attachment assembly communicating with a skateboard deck front end;
      iii) an element connecting the first attachment assembly communicating with the wheel fork assembly and the second attachment assembly communicating with the skateboard deck front end; and
      iv) an elastic, resilient element communicating with the element connecting the first attachment assembly communicating with the wheel fork assembly and the second attachment assembly communicating with the skateboard deck front end, the elastic, resilient element providing a range of motion between a first position in which the front skateboard wheels are above a planar surface below the skateboard upon connecting the motorized wheel assembly to a skateboard deck front end and a second position in which the front skateboard wheels contact the planar surface below the skateboard upon a skateboard rider stepping onto the skateboard deck, providing traction for the motorized wheel with the planar surface and allowing the skateboard rider to control forward or backward propulsion of the skateboard using the throttle control assembly, the braking control assembly, the motorized wheel assembly, and all skateboard wheels, and the elastic, resilient element providing the force to return to the first position after the rider steps off the skateboard deck.

2. The combination of a skateboard having a deck and front and rear wheels and a motorized wheel assembly of claim 1, wherein the element connecting the first attachment assembly communicating with the wheel fork assembly and the second attachment assembly communicating with the skateboard deck front end comprises a pivot hinge assembly.

3. The combination of a skateboard having a deck and front and rear wheels and a motorized wheel assembly of claim 2, wherein the elastic, resilient element providing a range of motion between the first attachment assembly communicating with the wheel fork assembly and the second attachment assembly communicating with the skateboard deck front end comprises equal sized compression springs affixed by fasteners on either side of the first attachment assembly communicating with the wheel fork assembly through corresponding apertures in first the attachment assembly and corresponding apertures in the second attachment assembly.

4. The combination of a skateboard having a deck and front and rear wheels and a motorized wheel assembly of claim 1, wherein the power supply comprises an interchangeable and rechargeable battery pack.

5. The combination of a skateboard having a deck and front and rear wheels and a motorized wheel assembly of claim 1, wherein the braking assembly comprises a hand brake lever attached to the handle bar assembly, and a disc brake assembly.

6. The combination of a skateboard having a deck and front and rear wheels and a motorized wheel assembly of claim 1, wherein the drive motor assembly comprises an electric motor comprising a sprocket connected by a fixed length drive chain to a sprocket on the at least one wheel.

7. The combination of a skateboard having a deck and front and rear wheels and a motorized wheel assembly of claim 1, wherein the throttle control assembly further comprises an on/off switch attached to the handle bar assembly.

8. The combination of a skateboard having a deck and front and rear wheels and a motorized wheel assembly of claim 1, wherein the second attachment assembly communicating with the skateboard deck front end is affixed to the skateboard deck front end by fasteners connecting a front skateboard truck to the skateboard deck.

9. The combination of a skateboard having a deck and front and rear wheels and a motorized wheel assembly of claim 1, wherein the second attachment assembly communicating with the skateboard deck front end is affixed to the skateboard deck front end by separate fasteners received through skateboard deck apertures.

10. The combination of a skateboard having a deck and front and rear wheels and a motorized wheel assembly of claim 1, wherein the second attachment assembly communicating with the skateboard deck front end comprises a receiving slot element affixed to the skateboard deck front end by fasteners connecting a front skateboard truck to the skateboard deck and a tongue element sized to be fixedly clipped into and held by the receiving slot element or releasably withdrawn from the receiving slot element.

11. A combination of a skateboard having a deck and front and rear wheels and a motorized wheel assembly, the motorized wheel assembly comprising at least one wheel comprising an axle, a wheel fork assembly connected to the axle, a first attachment assembly communicating with the wheel fork assembly, a second attachment assembly communicating with the skateboard deck, and an elastic, resilient element communicating with the first attachment assembly and the second attachment, providing a weight transfer assembly a) to elevate the front skateboard wheels off of a planar surface below the front skateboard wheels until a skateboard rider steps onto the skateboard deck at which time the rider's weight lowers the front skateboard wheels to the planar surface, b) to provide traction for the motorized wheel assembly with the planar surface, and c) to allow the skateboard rider to control forward or backward propulsion of the skateboard using the motorized wheel assembly.

12. The motorized wheel assembly of claim 11, further comprising:
    a) a drive motor assembly connected to the at least one wheel;
    b) a power supply connected to a throttle control assembly comprising a motor controller element and a throttle grip handle, the throttle control assembly also connected to the drive motor assembly;
    c) a braking assembly connected to the at least one wheel; and
    d) a brake control assembly connected to the braking assembly.

13. The combination of a skateboard having a deck and front and rear wheels and a motorized wheel assembly of claim 12, wherein the weight transfer assembly comprises in combination:
    a) the first attachment assembly communicating with the wheel fork assembly comprising a head tube assembly and a handle bar assembly;
    b) the second attachment assembly communicating with a skateboard deck front end;
    c) a pivot hinge pin connecting the first attachment assembly communicating with the wheel fork assembly and the second attachment assembly communicating with the skateboard deck front end; and
    d) an elastic, resilient element communicating with the first attachment assembly and the second attachment assembly providing a range of motion between the wheel fork assembly and the skateboard deck front end.

14. The combination of a skateboard having a deck and front and rear wheels and a motorized wheel assembly of claim 13, wherein the elastic, resilient element comprises equal sized compression springs affixed by fasteners on either side of the first attachment assembly communicating with the wheel fork assembly through corresponding apertures in first the attachment assembly and corresponding apertures in the second attachment assembly, and wherein the second attachment assembly communicating with the skateboard deck front end comprises a receiving element affixed to the skateboard deck front end by fasteners and a tongue element sized to be clipped into or released from the receiving element.

15. The combination of a skateboard having a deck and front and rear wheels and a motorized wheel assembly of claim 12, wherein the weight transfer assembly comprises in combination:
    a) the first attachment assembly communicating with the wheel fork assembly comprising a head tube assembly and a handle bar assembly;
    b) the second attachment assembly communicating with a skateboard deck front end and fixedly connected to the first attachment assembly, and comprising a receiving element affixed to the skateboard deck front end by fasteners and a tongue element sized to be clipped into or released from the receiving element; and
    c) a shock assembly disposed within the head tube assembly above the wheel fork element and providing a range of motion between the skateboard front wheels above a planar surface when the motorized wheel assembly is attached to the front end of the skateboard without a rider and the skateboard front wheels contacting the planar surface when a rider has stepped onto the skateboard deck.

16. The combination of a skateboard having a deck and front and rear wheels and a motorized wheel assembly of claim 12, wherein the weight transfer assembly comprises in combination:
    a) the first attachment assembly communicating with the wheel fork assembly comprising a head tube assembly and a handle bar assembly;
    b) the second attachment assembly communicating with a skateboard deck front end and fixedly connected to the first attachment assembly, and comprising a receiving element affixed to the skateboard deck front end by fasteners and a tongue element sized to be clipped into or released from the receiving element; and
    c) a shock assembly affixed to a bottom of a fork stem and to the at least one wheel axle and providing a range of motion of between the front skateboard wheels above a planar surface when the motorized wheel assembly is attached to the front end of the skateboard without a rider and the front skateboard wheels contacting the planar surface when a rider has stepped onto the skateboard deck.

17. The combination of a skateboard having a deck and front and rear wheels and a motorized wheel assembly of claim 12, wherein the weight transfer assembly comprises in combination:
    a) the first attachment assembly communicating with the wheel fork assembly comprising a head tube assembly and a handle bar assembly;
    b) the second attachment assembly communicating with a skateboard deck front end and fixedly connected to the first attachment assembly, and comprising a receiving element affixed to the skateboard deck front end by fasteners and a tongue element sized to be clipped into or released from the receiving element; and
    c) dual shocks affixed to a bottom of a fork stem and to the at least one wheel axle and providing a range of motion between the skateboard front wheels above a planar surface when the motorized wheel assembly is attached to the front end of the skateboard without a rider and the skateboard front wheels contacting the planar surface when a rider has stepped onto the skateboard deck.

18. The combination of a skateboard having a deck and front and rear wheels and a motorized wheel assembly of claim 12, wherein the drive motor assembly is integral to the wheel.

19. The combination of a skateboard having a deck and front and rear wheels and a motorized wheel assembly claim 12, wherein the drive motor assembly comprises an electric motor with sprocket connected by a fixed length drive chain to the at least one wheel further comprising a sprocket.

* * * * *